Nov. 27, 1962  H. G. DAWES  3,065,564
SELF-PROPELLED FISH LURE
Filed Oct. 12, 1961  2 Sheets-Sheet 1
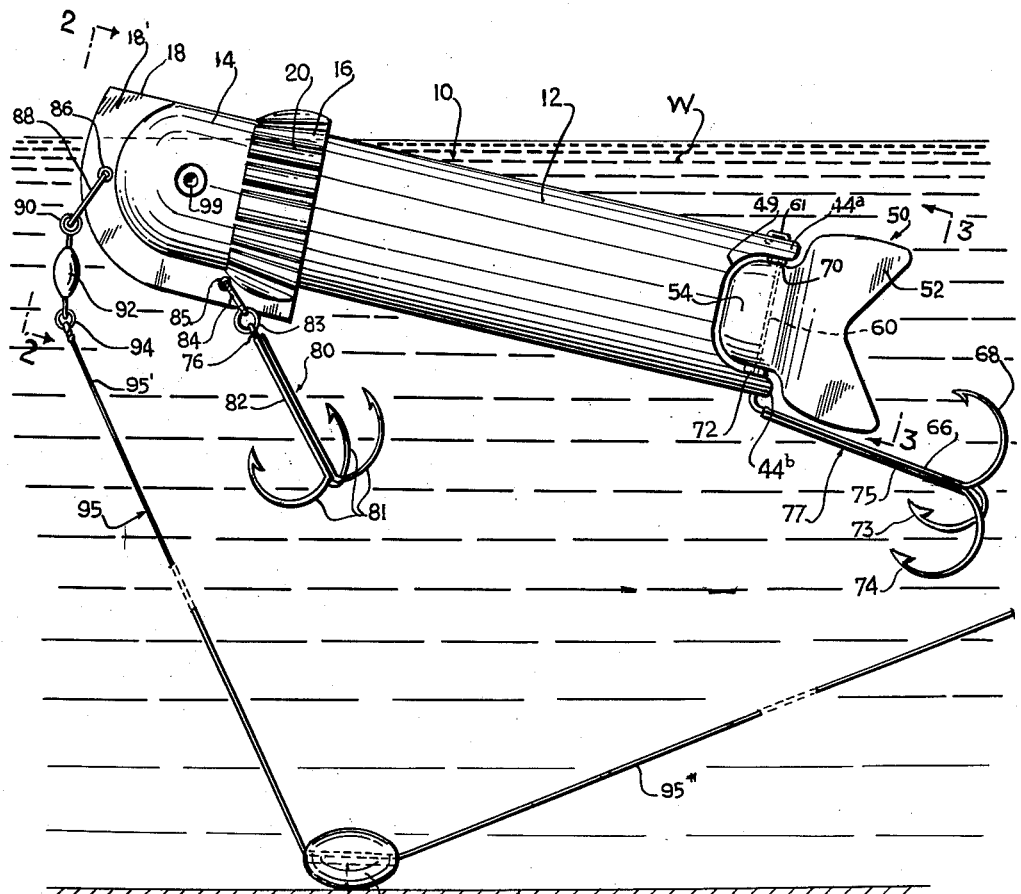
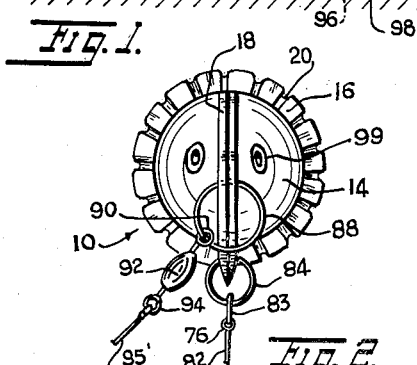
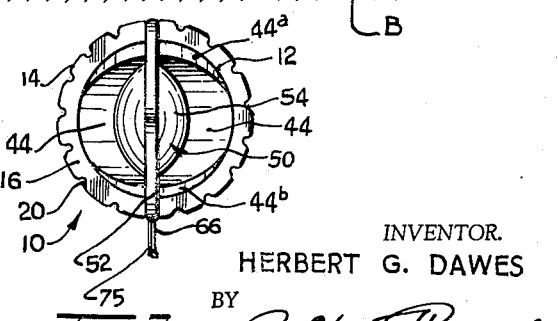
INVENTOR.
HERBERT G. DAWES
BY
*Zoltan Holacek*
ATTORNEY Nov. 27, 1962  H. G. DAWES  3,065,564
SELF-PROPELLED FISH LURE
Filed Oct. 12, 1961  2 Sheets-Sheet 2
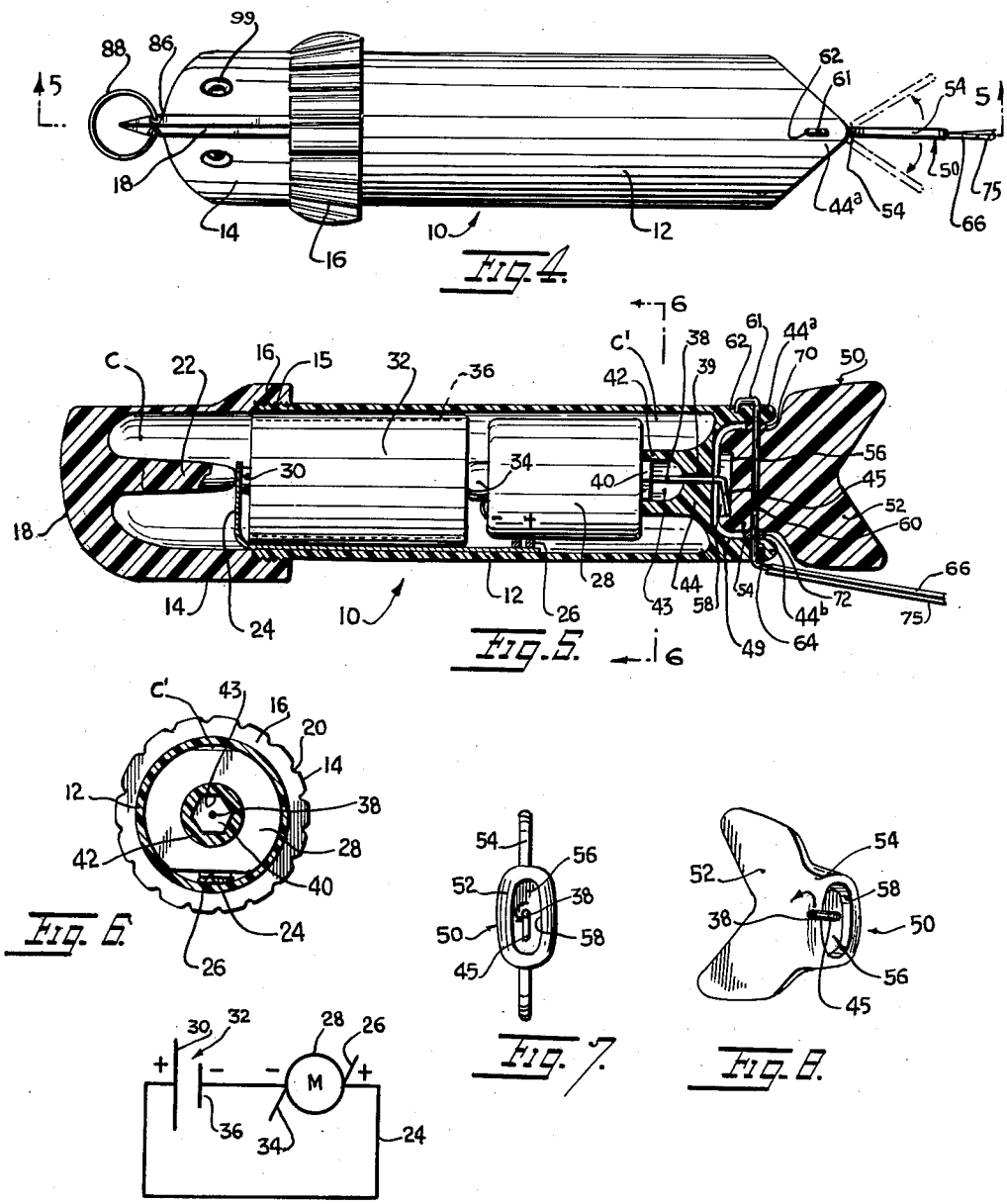
INVENTOR.
HERBERT G. DAWES
BY
ATTORNEY

3,065,564
SELF-PROPELLED FISH LURE
Herbert G. Dawes, Miami, Fla., assignor to
Louis Petragalla, Boca Raton, Fla.
Filed Oct. 12, 1961, Ser. No. 144,788
10 Claims. (Cl. 43—26.2)

This invention concerns an improved animated fish lure.

According to the invention, there is provided a fish lure device which simulates a live bait fish in appearance and which has lifelike movements when immersed in water. When tethered by a fishing line the device moves around in a circle. Its tail oscillates from side to side and the lure emits a low buzzing or humming sound.

It is therefore one object of the invention to provide an animated fish lure device including a hollow buoyant casing in which is a motor and electric battery, the device having a pivotally mounted tail which is oscillated by cam means driven by the motor.

Another object is to provide an animated fish lure of simplified structure, lower cost, and more trouble-free construction than prior fish lures of this general type.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of the fish lure device shown immersed in water, with an attached fishing line and associated fish hooks.

FIG. 2 is a front view taken on line 2—2 of FIG. 1.

FIG. 3 is a rear end view taken on line 3—3 of FIG. 1.

FIG. 4 is a top plan view of the device.

FIG. 5 is a longitudinal sectional view taken on line 5—5 of FIG. 4.

FIG. 6 is a sectional view taken on line 6—6 of FIG. 5.

FIGS. 7 and 8 are end elevational views of the tail in two different positions illustrating the mode of operation of the tail driving cam mechanism.

FIG. 9 is a circuit diagram of the electrical system of the device.

The device 10 shown in FIGS. 1–6, includes a generally cylindrical hollow casing 12 having an externally threaded front end 15 on which is detachably screwed a hollow rather cylindrical cap 14. The cap is internally threaded at its rear open end 16. The cap has a ridge 18 centrally located and projecting from its front rounded end. This ridge serves as a keel to stabilize the device and prevent axial rotation in the water W. The cap is externally knurled or grooved at its rear end to facilitate screwing the cap on and off the casing. The longitudinally extending grooves 20 also serve as stabilizing means to assist in preventing axial rotation of the device when immersed in water.

The cap has an internal axially disposed post 22 which extends or projects toward the open end of the cap. This post engages the end of an electrically conductive leaf spring 24 which extends longitudinally along the inside wall of the casing and terminates at positive terminal 26 of a small, rather cylindrical, direct current electric motor 28. The leaf spring 24 contacts the positive central terminal 30 of a cylindrical electric battery 32. The motor has a negative terminal 34 which is axially disposed at the forward end of the battery and pressed into contact with the electrically negative metal case 36 of the battery.

The motor has an axial rotatable shaft 38 which extends rearwardly. The shaft is journaled for rotation in a stationary boss 40. The boss is hexagonal in cross section as best shown in FIGS. 5 and 6 and is nonrotatably engaged in a seat 42 integrally formed with the closed rear end 44 of the casing. The seat has a recess 43 which is hexagonal in cross section, and filled with silicone grease.

Shaft 38 passes through an axial bore 39 in the rear end of the casing and terminates in a cam finger 45 bent at an obtuse angle to the axis of the shaft. The rear end 44 of the casing is formed with an external concave portion 49, the axis of which concave portion is horizontal or parallel to the top and bottom planes of the device.

The device has a rather flat blade-like tail member 50 which simulates the tail of a fish. The member 50 has a flattened and widened rear end portion 52 and a forward rather elliptical portion 54. In the forward portion 54 is a recess 56 with an oval rim or wall 58. The cam finger 45 engages and slides along and around wall 58 during rotation of the shaft 38 as illustrated in FIGS. 7 and 8.

The tail member 50 is pivotally mounted on a pintle rod 60. The rod has a hooked upper end 61 which engages in a hole 62 in the top pointed rear end $44^a$ of the casing. This rod passes through a bore 64 in the pointed bottom rear end $44^b$ of the casing and then extends rearwardly and downwardly to define a shank 66 and curved prong 68. Two plastic disks or washers 70, 72 preferably made of nylon serve as frictionless bearings for the member 50 which pivots or oscillates from side to side. The plane of the tail member 50 is vertical or perpendicular to the top and bottom planes of the device.

Two additional prongs 73, 74 extend in planes angularly disposed to the plane of prong 68. Prongs 73, 74 have shanks 75 soldered or welded to shank 66 forming triple-pronged hook 77. At the forward end of the device is a hook 80 with three prongs 81. The shanks 82 of the prongs are welded together. Hook 80 has an eye 76 engaged on a ring 83 which is engaged with a larger ring 84. Ring 84 is engaged in a hole 85 formed at the bottom of ridge 18; see FIG. 1.

At the front of the device, in ridge 18, is another hole 86 in which is engaged a ring 88. This ring is engaged by a ring 90 of a swivel 92. The swivel has a lower or outer ring 94 to which is tied the end 95' of a fishing line 95. The line passes through a bore 96 formed in a lead weight 98. This weight can be rested on the bottom B of a body of water W as indicated in FIG. 1. The line 95 will then have its upwardly slanted forward end portion 95' tethering the device and limiting its motion in the water to a circle determined by the length of the line portion 95'. The other end 95" of the line can terminate at a fishing pole or reel or may be held in hand by the fisherman.

The device will normally assume the axially inclined position shown in FIG. 1 when immersed in water. The nose end 18' of the ridge 18 will just project upwardly above the water surface. This position is effected due to the buoyant construction of the device. It will be noted that a rather large air chamber C is provided at the front end of the device inside the cap 14. Also, the cap and casing are formed of light plastic material preferably having closed cellular structure to increase the buoyancy of the device. A smaller air chamber C' is located at the end 44 of the casing. The motor 28 is located rearwardly of the center of gravity of the device and assist the device in assuming the desired inclined position.

The motor 28 is energized by battery 32 in the circuit indicated in FIG. 9. As the shaft 38 rotates, the tail member portion 54 serves as a cam follower to follow the cam finger and the tail end 52 of member 50 vibrates rapidly from side to side on the rod 60. The weight and vertical plane positions of the fish hooks and fishing line and the axial plane positions of the ridge 18, grooves 20, and tail member 50 all insure that the device is axially stabilized and does not rotate on its longitudinal axis while the oscillating tail member moves from side to side in an animated lifelike manner. At the same time, the oscillating tail member propels the device forwardly. The operating motor emits a humming or buzzing sound which attracts the attention of nearby fish to the device. The cap and casing can be formed in various colors to simulate the coloring of local bait fish. Simulated eyes 99 can be embedded in the sides of the cap to further enhance the lifelike appearance of the fish lure device.

The device is readily disassembled for replacement of the battery. The battery may be of rechargeable type. The motor is of well known commercially available type operating on one to three volts direct current.

The several parts of the cap, casing and tail member can be formed by conventional plastic molding machinery at low cost. The device is rugged, long-lasting and trouble-free in structure. The device can be made in various sizes for use in fishing for fish ranging in size from five pounds upward.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, and a flat tail member pivotally mounted at the closed end of the casing, said tail member having a forwardly located cam following recess, said shaft having a bent end defining a camming element engaged in said recess to oscillate said tail member from side to side as the shaft rotates.

2. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, and a flat tail member pivotally mounted at the closed end of the casing, said tail member having a forwardly located cam following recess, said shaft having a bent end defining a camming element engaged in said recess to oscillate said tail member from side to side as the shaft rotates, said cap having an external central ridge and circumferentially spaced longitudinal grooves for stabilizing said casing against rotation on its axis when immersed in water.

3. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, a flat tail member pivotally mounted at the closed end of the casing, said tail member having a forwardly located cam following recess, said shaft having a bent end defining a camming element engaged in said recess to oscillate said tail member from side to side as the shaft rotates, said cap having an external central ridge and circumferentially spaced longitudinal grooves for stabilizing said casing against rotation on its axis when immersed in water, said ridge having spaced holes therein, means for securing a fishing line engaged in one of the holes, and means for engaging a fish hook engaged in the other of said holes.

4. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, a flat tail member pivotally mounted at the closed end of the casing, said tail member having a forwardly located cam following recess, said shaft having a bent end defining a camming element engaged in said recess to oscillate said tail member from side to side as the shaft rotates, said cap having an external central ridge and circumferentially spaced longitudinal grooves for stabilizing said casing against rotation on its axis when immersed in water, said ridge having spaced holes therein, rings engaged in the respective holes, a fish line operatively engaged with one of the rings, and a fish hook engaged with the other of the rings.

5. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, a flat tail member pivotally mounted at the closed end of the casing, said tail member having a forwardly located cam following recess, said shaft having a bent end defining a camming element engaged in said recess to oscillate said tail member from side to side as the shaft rotates, said cap having an external central ridge and circumferentially spaced longitudinal grooves for stabilizing said casing against rotation on its axis when immersed in water, said ridge having a hole at the closed end of the cap, swivel means engaged in said hole, a fish line secured to said swivel means, and a weight having a bore, said weight being slidably engaged on said line with the line passing through the bore.

6. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, said closed end of the casing having an external concave portion, a rod extending across pointed top and bottom ends of said concave portion, and a tail member having a forward end portion pivotally engaged on said rod between said top and bottom ends of the concave portion, said tail member having a flattened and widened rear end portion, said shaft having a cammed end slidably engaging said forward end portion of the tail member to oscillate the rear end portion of the tail member from side to side as the shaft rotates.

7. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, said closed end of the casing having an external concave portion, a rod extending across pointed top and bottom ends of said concave portion, and a tail member having a forward end portion pivotally engaged on said rod between said top and bottom ends of the concave portion, said tail member having a flattened and widened rear end portion, said shaft having a cammed end slidably engaging said forward end portion of the tail member to oscillate the rear end portion of the tail member from side to side as the shaft rotates, said cap having an external central ridge for stabilizing said casing against rotation on its axis when immersed in water.

8. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, said closed end of the casing having an external concave portion, a rod extending across pointed top and bottom ends of said concave portion, a tail member having a forward end portion pivotally engaged on said rod between said top and bottom ends of the concave portion, said tail member having a flattened and widened rear end portion, said shaft having a cammed end slidably engaging said forward end portion of the tail member to oscillate the rear end portion of the tail member from side to side as the shaft rotates, said cap having an external central ridge for stabilizing said casing against rotation on its axis when immersed in water, and a fish line operatively secured to said ridge, said rod extending rearwardly from said casing and terminating in a curved prong.

9. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, said closed end of the casing having an external concave portion, a rod extending across pointed top and bottom ends of said concave portion, a tail member having a forward end portion pivotally engaged on said rod between said top and bottom ends of the concave portion, said tail member having a flattened and widened rear end portion, said shaft having a cammed end slidably engaging said forward end portion of the tail member to oscillate the rear end portion of the tail member from side to side as the shaft rotates, said cap having an external central ridge for stabilizing said casing against rotation on its axis when immersed in water, a fish line operatively secured to said ridge, said rod extending rearwardly from said casing and terminating in a curved prong, said motor means including a generally cylindrical electric motor driving said shaft, and a cylindrical battery axially aligned with said motor and in circuit therewith to energize the same.

10. An animated fish lure, comprising an elongated hollow casing having closed and open opposite ends, a hollow cap removably mounted on the open end of the casing and having an air compartment therein for floating the casing in an axially inclined position when immersed in water, motor means in said casing including a rotatable shaft extending outwardly beyond the closed end of the casing, said closed end of the casing having an external concave portion, a rod extending across pointed top and bottom ends of said concave portion, a tail member having a forward end portion pivotally engaged on said rod between said top and bottom ends of the concave portion, said tail member having a flattened and widened rear end portion, said shaft having a cammed end slidably engaging said forward end portion of the tail member to oscillate the rear end portion of the tail member from side to side as the shaft rotates, said cap having an external central ridge for stabilizing said casing against rotation on its axis when immersed in water, a fish line operatively secured to said ridge, said rod extending rearwardly from said casing and terminating in a curved prong, said motor means including a generally cylindrical electric motor driving said shaft, and a cylindrical battery axially aligned with said motor and in circuit therewith to energize the same, said cap having an axially extending portion, an electrical conductor engaged between said axially extending portion of the cap and a central terminal of the battery, said conductor terminating at a terminal of the motor, said closed end portion of the casing having an integrally formed seat engaging said motor nonrotatably and holding an axially projecting negative terminal of the motor in contact with the electrically conductive case of the battery.

References Cited in the file of this patent

UNITED STATES PATENTS

| | | |
|---|---|---|
| 798,836 | Sherbrook | Sept. 5, 1905 |
| 1,801,579 | Sunday | Apr. 21, 1931 |
| 2,065,337 | Lee | Dec. 22, 1936 |
| 2,511,154 | Garland | June 13, 1950 |
| 2,909,868 | Lewis | Oct. 27, 1959 |